(12) United States Patent
Egawa et al.

(10) Patent No.: US 10,515,051 B2
(45) Date of Patent: Dec. 24, 2019

(54) DATA ANALYSIS SUPPORTING APPARATUS

(71) Applicants: Kabushiki Kaisha Toshiba, Minato-ku (JP); Toshiba Solutions Corporation, Kawasaki-shi (JP)

(72) Inventors: Seiji Egawa, Fuchu (JP); Shozo Isobe, Kawasaki (JP); Shigeaki Sakurai, Tokyo (JP); Kazuyoshi Nishi, Fuchu (JP); Shigeru Matsumoto, Nishitokyo (JP); Rumi Hayakawa, Yokohama (JP)

(73) Assignees: Kabushiki Kaisha Toshiba, Minato-ku (JP); Toshiba Solutions Corporation, Kawasaki-shi (JP)

( * ) Notice: Subject to any disclaimer, the term of this patent is extended or adjusted under 35 U.S.C. 154(b) by 381 days.

(21) Appl. No.: 14/671,536

(22) Filed: Mar. 27, 2015

(65) Prior Publication Data

US 2015/0199368 A1    Jul. 16, 2015

Related U.S. Application Data

(63) Continuation of application No. PCT/JP2013/068362, filed on Jul. 4, 2013.

(30) Foreign Application Priority Data

Sep. 27, 2012    (JP) .................................. 2012-214884

(51) Int. Cl.
   *G06F 16/11*    (2019.01)
   *G06F 16/16*    (2019.01)
   (Continued)

(52) U.S. Cl.
   CPC .......... *G06F 16/125* (2019.01); *G06F 16/162* (2019.01); *G06F 16/284* (2019.01); *G06Q 10/04* (2013.01); *G06Q 10/0631* (2013.01)

(58) Field of Classification Search
   CPC .............. G06F 11/302; G06F 11/3409; G06F 11/3419; G06F 2201/88; G06F 17/30507;
   (Continued)

(56) References Cited

U.S. PATENT DOCUMENTS 5,557,773 A *   9/1996   Wang .................. G06F 17/5009
6,662,169 B2 * 12/2003   Rose ........................ B25J 9/161
                                                                706/16

(Continued)

FOREIGN PATENT DOCUMENTS

CN    1790199 A    6/2006
JP    3-28255 A    2/1991
(Continued)

OTHER PUBLICATIONS

Combined Chinese Office Action and Search Report dated Sep. 28, 2016 in Patent Application No. 201380050377.1 (with English language translation).

(Continued)

*Primary Examiner* — Angelica Ruiz
(74) *Attorney, Agent, or Firm* — Oblon, McClelland, Maier & Neustadt, L.L.P.

(57) ABSTRACT

A data analysis supporting apparatus according to an embodiment comprises a variable-type determining device, a variable-variation generating device, and a variable-contribution rate determining device. The variable-type determining device determines the type of each variable. The variable-variation generating device generates variations of each variable in accordance with the variable type determined and with a variable variation rule that defines a method of generating the variations of each variable of any type. The variable-contribution rate determining device calculates the rate at which the variations and analysis data (Continued)

contribute to the objective variable, and determines, from the rate, whether the variations should be used or deleted.

2 Claims, 12 Drawing Sheets

(51) Int. Cl.
*G06F 16/28* (2019.01)
*G06Q 10/04* (2012.01)
*G06Q 10/06* (2012.01)

(58) Field of Classification Search
CPC .......... G06F 17/30595; G06F 11/0754; G06F 11/2257
See application file for complete search history.

(56) References Cited

U.S. PATENT DOCUMENTS

| | | | | |
|---|---|---|---|---|
| 2001/0014966 A1* | 8/2001 | Numata | ............... | G05B 19/056 717/100 |
| 2002/0173998 A1* | 11/2002 | Case | ...................... | G06Q 10/04 705/7.39 |
| 2003/0220740 A1* | 11/2003 | Intriligator | ............. | G01W 1/10 702/3 |
| 2005/0159894 A1* | 7/2005 | Intriligator | ............. | G01W 1/10 702/3 |
| 2006/0218108 A1* | 9/2006 | Panfilov | ............. | G05B 13/0285 706/13 |
| 2008/0103853 A1 | 5/2008 | Watanabe et al. | | |
| 2009/0083738 A1* | 3/2009 | Kruglick | ........... | G06F 17/30575 718/100 |
| 2009/0089023 A1 | 4/2009 | Watanabe et al. | | |
| 2009/0254971 A1* | 10/2009 | Herz | ...................... | G06Q 10/10 726/1 |
| 2009/0299896 A1* | 12/2009 | Zhang | .................... | G06Q 40/00 705/38 |

FOREIGN PATENT DOCUMENTS

| | | |
|---|---|---|
| JP | 11-328255 A | 11/1999 |
| JP | 2000-020504 A | 1/2000 |
| JP | 4234841 B2 | 12/2008 |
| JP | 2009-086706 A | 4/2009 |

OTHER PUBLICATIONS

International Search Report dated Jul. 30, 2013 for PCT/JP2013/068362 filed Jul. 4, 2013 with English Translation.
International Written Opinion dated Jul. 30, 2013 for PCT/JP2013/068362 filed Jul. 4, 2013.
Extended European Search Report dated Apr. 4, 2016 in Patent Application No. 13842938.6.

* cited by examiner

| Date | Branch number | Work | Clerical work amount | Clerical-work amount rank |
|---|---|---|---|---|
| 2012/3/1 | B001 | Deposit | 150 | High |
| 2012/3/1 | B001 | Loan | 60 | Average |
| 2012/3/2 | B001 | Deposit | 80 | Low |
| : | : | : | : | : |
| 2012/3/1 | B002 | Exchange | 320 | Average |
| : | : | : | : | : |

| Date | Yen-to-dollar rate (in yen) | Yen-to-euro rate (in yen) |
|---|---|---|
| 2012/3/1 | 81.79 | 107.96 |
| 2012/3/2 | 81.07 | 107.90 |
| : | : | : |

FIG. 3

| Area | Date | Temperature (°C) | Precipitation (mm) | Weather |
|---|---|---|---|---|
| (1,1) | 2012/3/1 | 15.0 | 0 | Fair |
| (1,1) | 2012/3/2 | 12.4 | 5 | Cloudy, then rain |
| (1,1) | 2012/3/3 | 13.5 | 0 | Cloudy |
| : | : | : | : | : |
| (2,1) | 2012/3/1 | 16.7 | 2 | Cloudy, intermittent rain |
| : | : | : | : | : |

FIG. 4

|   | 1 | 2 | 3 | 4 | 5 | ·· |
|---|---|---|---|---|---|---|
| 1 | (1,1) | (2,1) | (3,1) | (4,1) | (5,1) |   |
| 2 | (1,2) | (2,2) | (3,2) | (4,2) | (5,2) |   |
| 3 | (1,3) | (2,3) | (3,3) | (4,3) | (5,3) |   |
| 4 | (1,4) | (2,4) | (3,4) | (4,4) | (5,4) |   |
| 5 | (1,5) | (2,5) | (3,5) | (4,5) | (5,5) |   |
| : |   |   |   |   |   |   |

FIG. 5

| Branch number | Area |
|---|---|
| B001 | (1,1) |
| B002 | (2,1) |
| B003 | (4,2) |
| : | : |

FIG. 6

| Date | Branch number | Work | Clerical work amount | Clerical-work amount rank | Temperature (°C) | Precipitation (mm) | Yen-to-dollar rate (in yen) | Yen-to-euro rate (in yen) |
|---|---|---|---|---|---|---|---|---|
| 2012/3/1 | B001 | Deposit | 150 | High | 15.0 | 0 | 81.79 | 107.96 |
| 2012/3/1 | B001 | Loan | 60 | Average | 15.0 | 0 | 81.79 | 107.96 |
| 2012/3/2 | B001 | Deposit | 80 | Low | 12.4 | 5 | 81.07 | 107.90 |
| ... | ... | ... | ... | ... | ... | ... | ... | ... |
| 2012/3/1 | B002 | Exchange | 320 | Average | 16.7 | 2 | 81.79 | 107.96 |
| ... | ... | ... | ... | ... | ... | ... | ... | ... |

F I G. 7

| No. | Rule type | Initial value | Updating regulation |
|---|---|---|---|
| 1 | Difference from n days before | n = 1 | n' = n + 1 |
| 2 | Difference from n years before | n = 1 | n' = n + 1 |
F I G. 8
| No. | Rule type | Initial value | Updating regulation |
|---|---|---|---|
| 1 | Difference from point (x-n, y) | n = 1 | n' = n + 1 |
| 2 | Difference from point (x, y-n) | n = 1 | n' = n + 1 |
F I G. 9
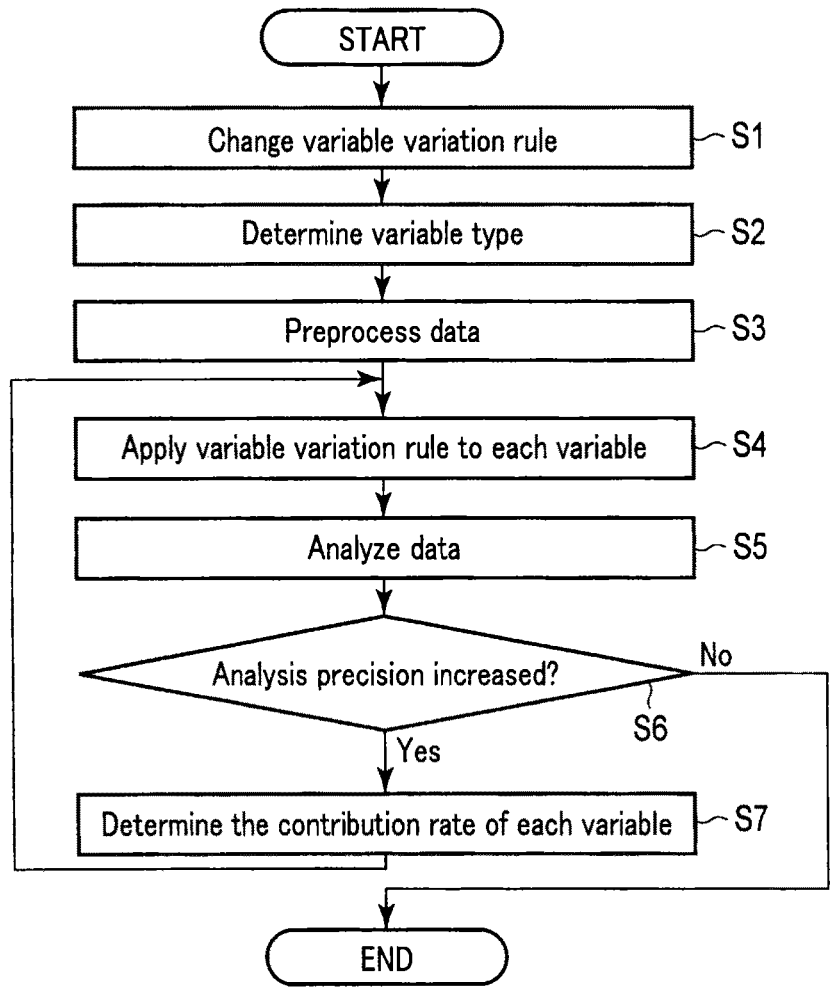
F I G. 10

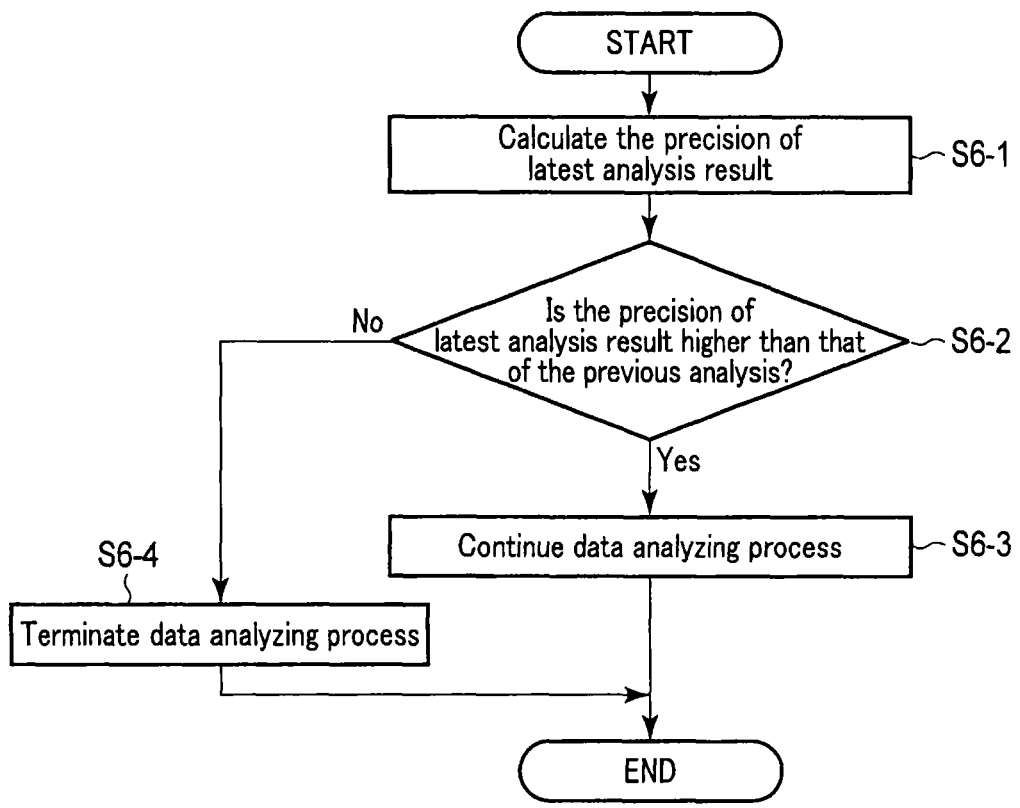
F I G. 13

| Variable | Variable type | Rule type | Updated state | Value | Variation generated |
|---|---|---|---|---|---|
| Temperature | Time | Difference from n days before | Increased | 1 | Temperature difference from one day before |
| | | Difference from n years before | Increased | 1 | Temperature difference from one year before |
| | Space | Difference from point (x-n, y) | Increased | 1 | Temperature difference from point (x-1, y) |
| | | Difference from point (x, y-n) | Increased | 1 | Temperature difference from point (x, y-1) |

F I G. 15

| Variable | Variable type | Rule type | Updated state | Value | Variation generated |
|---|---|---|---|---|---|
| Temperature | Time | Difference from n days before | Increased | 1 | Temperature difference from one day before |
| | | Difference from n years before | Deleted | 1 | Temperature difference from one year before |
| | Space | Difference from point (x-n, y) | Increased | 1 | Temperature difference from point (x-1, y) |
| | | Difference from point (x, y-n) | Deleted | 1 | Temperature difference from point (x, y-1) |

F I G. 16

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | Difference from n years before | Deleted | 1 | Temperature difference from one year before |
| | Space | Difference from point (x-n, y) | Increased | 1 | Temperature difference from point (x-1, y) |
| | | Difference from point (x, y-n) | Deleted | 1 | Temperature difference from point (x, y-1) |

F I G. 17

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | Difference from n years before | Completed | 1 | ~~Temperature difference from one year before~~ |
| | Space | Difference from point (x-n, y) | Increased | 1 | Temperature difference from point (x-1, y) |
| | | Difference from point (x, y-n) | Deleted | 1 | Temperature difference from point (x, y-1) |

F I G. 18

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | Difference from n years before | Completed | 1 | ~~Temperature difference from one year before~~ |
| | Space | Difference from point (x-n, y) | Increased | 1 | Temperature difference from point (x-1, y) |
| | | | | 2 | Temperature difference from point (x-2, y) |
| | | Difference from point (x, y-n) | Deleted | 1 | Temperature difference from point (x, y-1) |

F I G. 19

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | Difference from n years before | Completed | 1 | ~~Temperature difference from one year before~~ |
| | Space | Difference from point (x-n, y) | Increased | 1 | Temperature difference from point (x-1, y) |
| | | | | 2 | Temperature difference from point (x-2, y) |
| | | Difference from point (x, y-n) | Completed | 1 | ~~Temperature difference from point (x, y-1)~~ |

F I G. 20

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | | | <u>3</u> | <u>Temperature difference from three days before</u> |
| | | Difference from n years before | Completed | 1 | ~~Temperature difference from one year before~~ |
| | Space | Difference from point (x-n, y) | Deleted | 1 | Temperature difference from point (x-1, y) |
| | | | | 2 | Temperature difference from point (x-2, y) |
| | | Difference from point (x, y-n) | Completed | 1 | ~~Temperature difference from point (x, y-1)~~ |

FIG. 21

| Variable | Variable type | Rule type | Updated state | Value | Variation generated |
|---|---|---|---|---|---|
| Temperature | Time | Difference from n days before | Increased | 1 | Temperature difference from one day before |
| | | | | 2 | Temperature difference from two days before |
| | | | | <u>3</u> | <u>Temperature difference from three days before</u> |
| | | Difference from n years before | Completed | 1 | ~~Temperature difference from one year before~~ |
| | Space | Difference from point (x-n, y) | Completed | 1 | Temperature difference from point (x-1, y) |
| | | | | 2 | ~~Temperature difference from point (x-2, y)~~ |
| | | Difference from point (x, y-n) | Completed | 1 | ~~Temperature difference from point (x, y-1)~~ |

FIG. 22

| Area | Date | Temperature | Temperature difference from one day before |
|---|---|---|---|
| (1,1) | 2012/3/1 | 15.0 | - |
| (1,1) | 2012/3/2 | 12.4 | -2.6 |
| (1,1) | 2012/3/3 | 13.5 | 1.1 |
| (1,1) | 2012/3/4 | 12.0 | -1.5 |
| ⋮ | ⋮ | ⋮ | ⋮ |
| (2,1) | 2012/3/1 | 16.7 | - |
| ⋮ | ⋮ | ⋮ | ⋮ |

FIG. 23

| Area | Date | Temperature | Temperature difference from point (x-1, y) |
|---|---|---|---|
| (1,1) | 2012/3/1 | 15.0 | - |
| (1,2) | 2012/3/1 | 15.0 | 0.0 |
| (1,3) | 2012/3/1 | 14.2 | -0.8 |
| (1,4) | 2012/3/1 | 16.3 | 2.1 |
| ⋮ | ⋮ | ⋮ | ⋮ |
| (1,1) | 2012/3/2 | 12.4 | - |
| ⋮ | ⋮ | ⋮ | ⋮ |

DATA ANALYSIS SUPPORTING APPARATUS

CROSS-REFERENCE TO RELATED APPLICATIONS

This application is a Continuation application of PCT application No. PCT/JP2013/068362, filed on Jul. 4, 2013, and is based upon and claims the benefit of priority from Japanese Patent Application No. 2012-214884, filed on Sep. 27, 2012, the entire contents of which are incorporated herein by reference.

FIELD

Embodiments described herein relate generally to a data analysis supporting apparatus.

BACKGROUND

In the process of extracting knowledge from a collected database, a data analysis supporting apparatus is used, which supports the generation of a data set (analysis data set) to input to the analysis algorithm in order to attain an analysis result of high precision.

Regarding data analysis supporting apparatuses of this type, a system is known, which uses a fixed synthesis tool prepared (i.e., conversion formulae) to synthesize at least one explanatory variable contained in the data to analyze, generating new explanatory variables. In this system, an explanatory variable that increases the analysis precision is selected from the explanatory variables, and the selection is repeated, gradually increasing the analysis precision. Further, in this system, all synthesis tool provided are operated on a trial basis, and the best possible combination of explanatory variables is selected and used, thereby further increasing the analysis precision.

Such a system as described above applies a fixed synthesis tool to any variable (or variable group of variables) since the same synthesis tool (i.e., conversion formulae) is permanently utilized. Therefore, the system is disadvantageous in that a synthesis tool appropriate for each variable cannot be dynamically determined.

A solution to such problem of the invention is to provide an analysis supporting apparatus that applies different conversion formulae to the variables, respectively, thereby to generate new variables.

BRIEF DESCRIPTION OF THE DRAWINGS

FIG. 3 is a schematic diagram showing an example of foreign exchange data processed in the embodiment;

FIG. 4 is a schematic diagram showing an example of meteorological data processed in the embodiment;

FIG. 5 is a schematic diagram showing the area codes used in the embodiment;

FIG. 6 is a schematic diagram showing an example of bank branch data used in the embodiment;

FIG. 7 is a schematic diagram showing an example of combined data;

FIG. 8 is a schematic diagram showing an example of the variable variation rule applied to the time-type variables in the embodiment;

FIG. 9 is a schematic diagram showing an example of the variable variation rule applied to the space-type variables in the embodiment;

FIG. 10 is a flowchart explaining how the embodiment operates;

FIG. 13 is a flowchart explaining, in detail, Step S6 performed in the embodiment;

FIG. 15 is a schematic diagram showing examples of variations being generated in the embodiment;

FIG. 16 is a schematic diagram showing other examples of variations being generated in the embodiment;

FIG. 17 is a schematic diagram showing further examples of variations being generated in the embodiment;

FIG. 18 is a schematic diagram showing still other examples of variations being generated in the embodiment;

FIG. 19 is a schematic diagram showing further examples of variations being generated in the embodiment;

FIG. 20 is a schematic diagram showing still other examples of variations being generated in the embodiment;

FIG. 21 is a schematic diagram showing other examples of variations being generated in the embodiment;

FIG. 22 is a schematic diagram showing still other examples of variations being generated in the embodiment;

FIG. 23 is a schematic diagram showing a method of calculating the values of the time-type variations in the embodiment; and FIG. 24 is a schematic diagram showing a method of calculating the values of the space-type variations in the embodiment.

DETAILED DESCRIPTION

In general, according to one embodiment, a data analysis supporting apparatus generates variations of each variable from analysis data having an objective variable and variables that are explanatory variables for the objective variable, thereby supporting the analysis of the analysis data. The apparatus comprises a variable-type determining device, a variable-variation generating device, and a variable-contribution rate determining device.

The variable-type determining device is configured to determine the type of each variable.

The variable-variation generating device is configured to generate variations of each variable in accordance with the variable type determined and with a variable variation rule that defines a method of generating the variations of each variable of any type.

The variable-contribution rate determining device calculates the rate at which the variations contribute to the objective variable, and determines, from the rate, whether the variations should be used or deleted.

An embodiment of this invention will be described with reference to the accompanying drawings. The data analysis supporting apparatus according to the embodiment can be composed of hardware components only or can be a combination of hardware resource and software. The software that composes the apparatus, jointly with the hardware resource, is a program already installed in a computer from a network or non-transitory computer-readable storage medium and executed by the processor of the computer, enabling the computer to perform the functions of supporting the data analysis supporting apparatus.

Figures 1, 2:
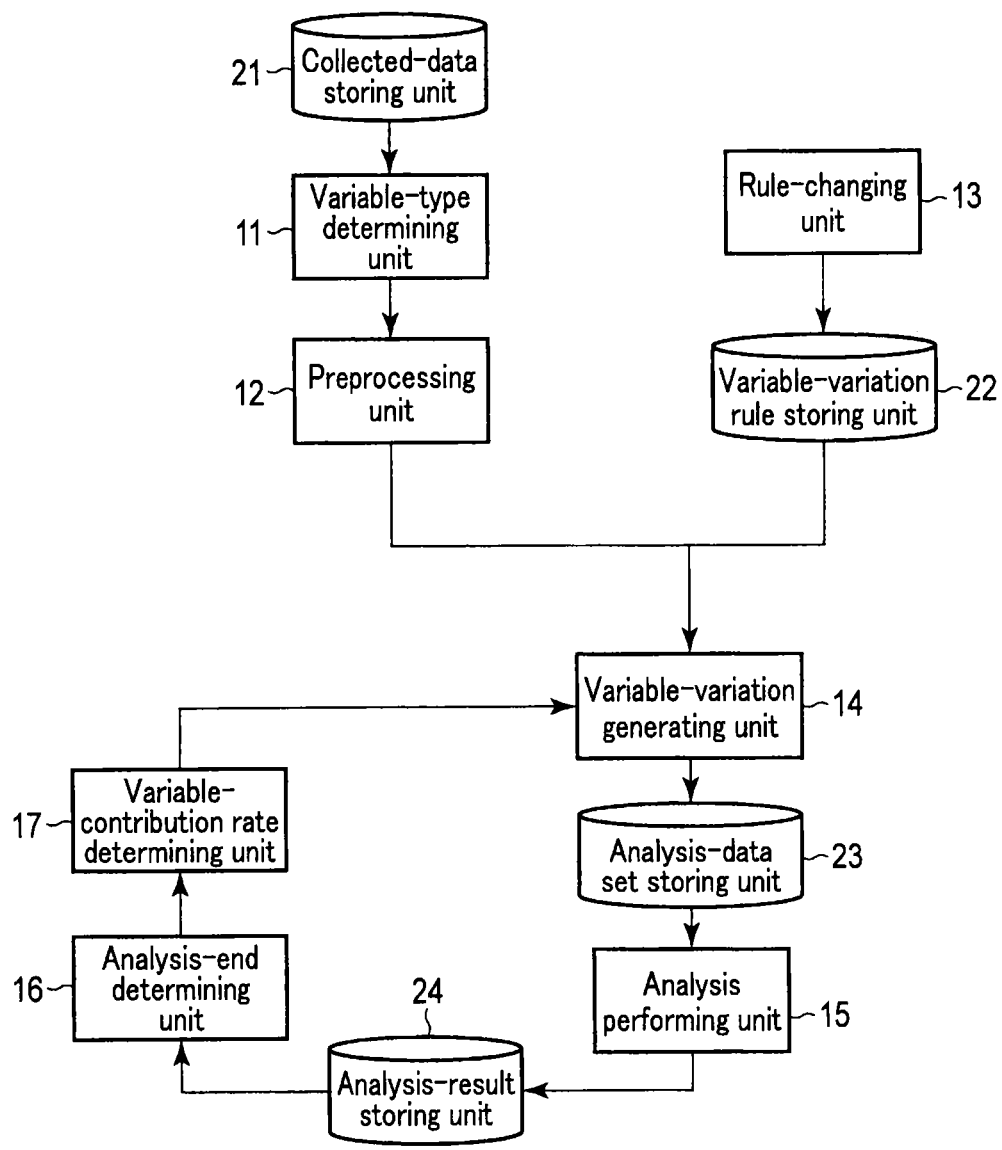
FIG. 1 is a schematic diagram showing the configuration of a data analysis supporting apparatus according to an embodiment of this invention.
FIG. 2 is a schematic diagram showing an example of clerical-work amount data processed in the embodiment.

FIG. 1 is a schematic diagram showing the configuration of a data analysis supporting apparatus according to an embodiment of this invention. The data analysis supporting apparatus generates variations of each variable, from the data to be analyzed which has an objective variable and candidates of the explanatory variable for the objective variable, thereby supporting the analysis of the data that should be analyzed.

More specifically, the data analysis supporting apparatus comprises a variable-type determining unit 11, a preprocessing unit 12, a rule-changing unit 13, a variable-variation generating unit 14, an analysis performing unit 15, an analysis-end determining unit 16, a variable-contribution rate determining unit 17, a collected-data storing unit 21, a variable-variation rule storing unit 22, an analysis-data set storing unit 23, and an analysis-result storing unit 24.

The variable-type determining unit 11 acquires, as input, data collected and stored as data to analyze, from the collected-data storing unit 21, and then determines the types of the variables contained in this data. More specifically, the variable-type determining unit 11 determines the types (kinds) of the variables. For example, the variable-type determining unit 11 determines whether each variable belongs to a time type that changes with time or a space type that changes in accordance with its position in space. Further, the variable-type determining unit 11 may prompt the user to determine the type of any variable it cannot discriminate, by outputting a message to the user.

The preprocessing unit 12 performs general preprocessing on each variable in accordance with the variable type determined in the variable-type determining unit 1. This data so processed is supplied to the variable-variation generating unit 14. As the preprocessing, missing-value processing, noise processing and normalizing processing (e.g., unit conversion or notation unification) may be used, as needed. The preprocessing unit 12 is, however, an additional component, and can be disposed of.

The rule-changing unit 13 is an interface configured to change the variable variation rule defined for the respective variable types to increase variable variations in number. More precisely, the rule-changing unit 13 changes the variable variation rule stored in the variable-variation rule storing unit 22, in response to any rule-changing instruction input to it.

The variable-variation generating unit 14 applies the variable variation rule to each variable, increasing (or decreasing) the number of variable variations. More precisely, the variable-variation generating unit 14 generates variations of each variable on the basis of the variable type determined by the variable-type determining unit 11 and the variable variation rule defining a method of generating variable variation for each variable type. The variable-variation generating unit 14 writes the variation so generated, and the data to analyze, in the analysis-data set storing unit 23. Further, the variable-variation generating unit 14 receives a decision as to whether the variation should be used or not from the variable-contribution rate determining unit 17, and generates the variations of the respective variables on the basis of the decision.

The analysis performing unit 15 analyzes the variations and the data to analyze, all stored in the analysis-data set storing unit 23, by using an analysis model/algorithm. The result of the analysis is written in the analysis-result storing unit 24. The set of any variation and data to analyze is called analysis data.

Every time the analysis performing unit 15 performs analysis, the analysis-end determining unit 16 compares the previous analysis result stored in the analysis-result storing unit 24 with the present analysis result, thereby determining whether the analysis should be continued or not. If the present analysis result is more precise than the previous analysis result, it is determined that the analysis should be continued. Otherwise (if the precision does not change or the present analysis result is low this time), the analysis-end determining unit 16 determines that the analysis should be terminated. In most cases, the precision of the analysis result is a value calculated as, for example, the precision of the analysis model/algorithm. If the analysis-end determining unit 16 determines that the analysis should be continued, it will activate the variable-contribution rate determining unit 17. If the analysis-end determining unit 16 determines that the analysis should be terminated, it will terminate the analysis.

The variable-contribution rate determining unit 17 calculates the rate at which the variations and the analysis data stored in the analysis-data set storing unit 23, may contribute to the objective variable of each explanatory variable. The variable-contribution rate determining unit 17 determines that variations should be increased for any variable that greatly contributes to the objective variable, and further determines that variations should be decreased for any variable contributing little to the objective variable. More specifically, the variable-contribution rate determining unit 17 first calculates the rate at which each variation generated in the variable-variation generating unit 14 contributes to the objective variable, and then determines, from this rate, whether the variation should be used or deleted. The decision made by the variable-contribution rate determining unit 17 is supplied to the variable-variation generating unit 14. The rate at which each variation contributes to the objective variable is, for example, the contribution rate of a commonly used variable or the collation degree the explanatory variable has with respect to the objective variable, as is needed in some cases. The decision that the variation should be used can be regarded as the decision that the variations should be increased in number. The decision that the variations be deleted can be regarded as the decision that variations should be decreased or should not be increased in number. The process may be performed on a plurality of variables at the same time. For example, the decision of increasing the variations of variable A and the decision of decreasing the variations of variable B may be made at the same time.

It will be explained how the data stored in the storing units 21 to 24 is analyzed to determine the amount of clerical work in a branch of a bank. More specifically, the factors influencing the amount of clerical work in the bank's branch are extracted from the clerical-work amount data and external data items, i.e., foreign exchange data and meteorological data.

The total amount of the various clerical works in the bank's branch shall be called "clerical-work amount." The clerical-work amount depends on the number of customers who have visited the branch and some other factors. How many customers visit the branch depends on factors directly related to bank work, such as whether the day is a payday or the last day of the month, and also on external factors such as weather and changes in foreign exchange rates. Therefore, the clerical-work amount data and the external factor data must be analyzed, in association with each other.

The number of the visiting customers may depend more on yesterday's stock price than on today's stock price. Alternatively, it may more depend on the temperature difference between yesterday or the average temperature for the last seven days, than today's temperature. The data should therefore be analyzed in accordance these factors that change with time. The factors change indefinitely, and a tool of analyzing the data at high efficiency is demanded.

First, the various data items stored in the collected-data storing unit 21 will be described.

The collected-data storing unit 21 is a memory device from which the variable-type determining unit 11 can read data, and which stores (memorizes) clerical-work amount data, foreign exchange data, meteorological data, bank branch data and combined data. The collected-data storing unit 21 may be any memory device from which the variable-type determining unit 11 can read data. Therefore, the collected-data storing unit 21 need not be incorporated in the analysis supporting apparatus, and may be provided outside the analysis supporting apparatus. The clerical-work amount data, foreign exchange data and meteorological data may generally be called "collected data." The bank branch need not be called "collected data." The combined data may be called "data to analyze."

As shown in FIG. 2, the clerical-work amount data is table data showing dates, branch numbers, work items, i.e., work names, clerical-work amount items, i.e., clerical-work amounts, and clerical-work amount ranks, which are associated with one another. In this specification, any data in the form of a table will be called "data table," each item in any data table will be called "variable name" or "variable," and the value of each item will be called "value of the variable" or "variable." Any variable name underlined means that the variable name is the main key in the data table. The main key is a set of one or more variables, and the variable or variables can identify each row of the data table uniquely. As to the clerical-work amount data, for example, a row can be identified by a combination of "date," "branch number" and "work." This combination of three variables is the main key for the clerical-work amount.

The clerical-work amount is recorded, day by day, for each branch number and each clerical work. The first row of the table of FIG. 2 shows, "The clerical work amount concerning deposit is 150 on Mar. 1, 2012 at branch B001." Usually, the absolute value of the clerical-work amount greatly depends on the business scale of the branch and the characteristics of each work performed in the branch. Such an unchanging factor is excluded from the data analysis, and the influence of the changing external factors is analyzed. This is why the attribute of "clerical-work amount rank" based on the average day-to-day work amount at the bank branch is added in the table of FIG. 2, showing how much clerical work is performed in the bank branch on a specific day. The "clerical-work amount rank" is determined by, for example, a method comprising the following three steps (1) to (3):

(1) The work-amount data items are sorted for bank branch numbers and also for work types, acquiring the amount of a specific work performed in each bank branch on a particular day.

(2) The work-amount data items so sorted are sorted in descending order of work amount.

(3) Any work amount falling in the largest one-third group is labeled "large," any work amount falling in the smallest one-third group is labeled "small," and any remaining work amount is labeled "average."

How to determine the "clerical-work amount rank" is not limited to this method, nevertheless. For example, the work-amount data items may be sorted in descending order of absolute values of the clerical-work amounts, without considering which type of work has been performed in which bank branch. Then, any work amount falling in the largest one-third group, any work amount falling in the smallest one-third group and any remaining work amount may be labeled "large," "small" and "average," respectively.

As shown in FIG. 3, each item of the foreign exchange data is composed of the date, yen-to-dollar exchange rate (in yen) and yen-to-euro rate (in yen) which are associated with one another.

As shown in FIG. 4, each item of the meteorological data is composed of the area, date, temperature, precipitation and weather. That is, the meteorological data is a table in which the area codes showing the positions of areas, date items each showing the date as a value, temperature items each showing temperature (° C.) as a value, precipitation items each showing precipitation (mm) as a value, and weather items each showing the weather at an area are associated with one another. As shown in FIG. 5, the area codes identify the square-shaped areas defined by dividing a region. Each area code is composed of two numbers, one representing the position in the east-west direction and the other representing the position in the north-south direction. Thus, the two numbers specify a square-shaped area.

The bank branch data is used to associate the work-amount data with the meteorological data. As shown in FIG. 6, the bank branch data is a table in which branch numbers are associated with the areas, each having an area code.

The combined data is acquired by combining the foreign exchange data and meteorological data with the clerical-work amount data. As shown in FIG. 7, the combined data is a table. Each item of the combined data is composed of date item, branch number item (i.e., brunch number), work item (i.e., work name), clerical-work amount item (i.e., clerical-work amount), clerical-work mount rank item (i.e., clerical-work mount rank), temperature item (i.e., temperature (° C.), precipitation item (i.e., precipitation (mm)), yen-to-dollar exchange rate item (i.e., yen-to-dollar exchange rate in yen), and yen-to-euro rate item (i.e., yen-to-euro rate in yen), which are associated with one another.

The combined data may be generated by mechanically combining the data items stored in the collected-data storing unit 21, by using the main key. Alternatively, the data items may first be manually combined and then written in the collected-data storing unit 21.

The variable variation rule stored in the variable-variation rule storing unit 22 will be described. The variable variation rule defines the method of increasing the number of variable variations of each type such as time-type or space-type.

The "type" of a variable specifies what may change the variable. The type of a variable (e.g., temperature) represents the categories (e.g., time and space) encompassing the variables (e.g., date and area code) in the main key designating the variable (i.e., temperature). The variable of the main key and the category (type) of each variable of the main key are defined as, for example, "date item" and "time" type, or "list of area code values" and "space" type, and are associated with each other in the variable-type determining unit 11. The word "type" may be replaced by "kind" or "nature," as needed. Similarly, "category" may be replaced by another word such as "encompassing idea" or "higher idea."

"Time-type variable" is a variable that changes with time. The "yen-to-dollar exchange rate," for example, is a variable that changes with time. The variable "rate quoted last today," for example, differs from the "rate quoted last on yesterday," and from the "rate quoted last on the day before yesterday."

The variable "temperature in a specific area at a particular time," for example, differs from the "temperature in the same area one hour before."

"Space-type variable" is a variable that changes with the position it assumes in a space. The "temperature at specific time at a particular place" is a value that differs from the "temperature at the same time at an adjacent place."

In this case, the variable "temperature" is both the time type and the space type. Thus, a variable may be of two or more types.

The type of variable is not limited to the time type or space type. Rather, it may be a quantity type or category type.

Variables of any type are subjected to a variable variation rule composed of "rule type," "initial value" and "updating regulation." As to time-type variables, for example, a variable variation rule is defined as shown in FIG. 8.

That is, the variable variation rule for time-type variables is defined as a table. In the table, a rule number (i.e., a natural number), a rule type (i.e., difference from the rule type for n days before, or difference from the rule type for n years before), an initial value (i.e., n=1), and an updating regulation (i.e., n'=n+1) are defined, one associated with another, for each time-type variable. The rule number is an additional item, and may be omitted. The term of "variable variation" has two meanings. First, it means a change in the type of the variable (e.g., only day, day and month, and day, month and year). Second, it means a change in a particular variable (e.g., one day, two days, three days, . . . ). The rule types of the same rule number correspond to variations of particular values made by changing variation generating value n. On the other hand, the rule types of different rule numbers correspond to variations changed in terms of variable type. The variables of the time type are not limited to differences (e.g., difference from the day before, difference from the month before, difference from the year before, difference from two days before, difference from two months before, difference from two years before, . . . ). Rather, they may be rates (e.g., ratio to the value day before, ratio to the value the month before, ratio to the value two days before, ratio to the value two months before, . . . ). Further, the average value and the difference between the maximum and minimum values may be used as variables of the time type. In this instance, the updating regulation item is increased in one direction, to n'=n+1. Instead, the updating regulation item may be decreased in one direction, to n'=n−1. If the updating regulation value n' is decreased, the initial value n, for example, may be set to the maximum value of the variable, such as 31 (days), 12 (months) or 2012 (year).

As shown in FIG. 9, the variable variation rule applied to the space-type variables is provided in the form of a table. In this table, a rule number item (i.e., a natural number), a rule type item (i.e., difference from the rule type for point (x−n, y) or from the rule type for point (x, y−n), an initial value item (i.e., n=1), and an updating regulation (i.e., n'=n+1) are defined, one associated with another, for each time-type variable. The rule number is an additional item, and may be excluded from the variable variation rule. The space-type variables are not limited to the area codes described above. Instead, they may be address notations, GPS notations, motion distances, or the like, as needed. The address notations are, for example, 01:Hokkaido, 02: Aomori, . . . 15: Tokyo, . . . , 15001: Chuoh-ku, 15002: Minato-ku, etc., each being a value defining a parent-child relation of spaces. In this case, the variations may be increased in the parent-to-child direction, for example "prefecture only"→"prefecture and city, town or village"→"prefecture, city, town or village and lot number." As the GPS notations (longitude-latitude notations), east long. 60°, north lat. 22°, 0 m above sea level, . . . can be used, if necessary. The variations can be increased in number by, for example, changing (or increasing) the start point, using more start points namely, or changing (or increasing) the distance from the start point, if a formula is given for converting any variation to the distance from a specific start point. The distance from the start point may be changed, for example, within (or outside of) the radius of 300 m or 500 m from start point A, or within (or outside of) the radius of 300 m or 500 m from start point B. Further, the motion distances may be defined in the same way as, for example, the GPS notations.

The analysis data stored in the analysis-data set storing unit 23 will be described. The analysis data includes variations generated by the variable-variation generating unit and also the data to analyze. Thus, the analysis data is a combination of variation and analysis data. The analysis data is therefore called an "analysis data set."

The analysis result stored in the analysis-result storing unit 24 will be described. The analysis result stored in the analysis-result storing unit 24 is written every time the analysis performing unit 15 analyzes the variations and the analysis data. The last analysis result and the present analysis result are read by the analysis-end determining unit 16.

It will be explained how the data analysis supporting apparatus configured as described above operates. First, the sequence of operations will be described with reference to the flowchart of FIG. 10.

The rule-changing unit 13 changes the variable variation rule stored in the variable-variation rule storing unit 22, in response to any rule-changing instruction input by the user (Step S1). It is not absolutely necessary to change the variable variation. That is, the step of changing the variable variation may not be performed.

The variable-type determining unit 11 determines the types of the variables contained in the analysis data stored in the collected-data storing unit 21 (Step S2). The type of each variable represents the type of the variable.

In accordance with the variable type determined in Step S2, the preprocessing unit 12 performs a preprocessing of an ordinary type, such as missing-value processing (Step S3), to carry out ordinary data analysis.

The variable-variation generating unit 14 selects, from the variable-variation rule storing unit 22, the variable variation rule appropriate for the type of the variable contained in the analysis data pre-processed in Step S3. The variable-variation generating unit 14 then applies the variable variation rule to the variables contained in the data to analyze. Thus, the variable-variation generating unit 14 generates variations of each variable on the basis of the variable type and the variable variation rule. The variable-variation generating unit 14 then writes the variations increased in number and the data to analyze (hereinafter called "analysis data") in the analysis-data set storing unit 23 (Step S4).

The analysis performing unit 15 analyzes the analysis data stored in the analysis-data set storing unit 23, by using the analysis model/algorithm. The result of the analysis is written in the analysis-result storing unit 24 (Step S5).

The analysis-end determining unit 16 compares the present analysis result stored in the analysis-result storing unit 24 with the previous analysis result with (Step S6). If the present analysis result has not been improved, the analysis-end determining unit 16 determines that the analysis should be terminated. If the present analysis result has been improved, the analysis-end determining unit 16 determines that the analysis should be continued, and the process goes to Step S7.

The variable-contribution rate determining unit 17 calculates the rate at which the variations generated contribute to the objective variable, and determines, from the rate calculated, whether the variations should be used or deleted. For example, the variable-contribution rate determining unit 17 determines that the variations greatly contributing to the objective variable should be used and that the variations should be increased in number. On the other hand, if the unit 17 determines that some variations should be deleted for any variable contributing little to the objective variable, the variations are neither increased nor decreased in number (Step S7). Then, Steps S4 to S7 are repeated.

Thus, the sequence of operation is completed.

Step S2 of determining the types of the variables will be explained in detail, with reference to the flowchart of FIG. 11. The variable-type determining unit 11 determines the type of each variable contained in the analysis data stored in the collected-data storing unit 21. In this embodiment, the variables are of two types, i.e., time type and space type. In Step S2, the variable type is determined mechanically or manually.

The variable-type determining unit 11 selects one variable the type of which has not been determined (Step S2-1). Assume that variable a is selected.

The variable-type determining unit 11 further selects one variable from the main key of variables a (Step S2-2). Assume that variable k is selected.

The variable-type determining unit 11 then tries to determine the type of the variable k (Step S2-3). If the type of the variable k is determined, the variable-type determining unit 11 goes to Step S2-7. If the type of the variable k cannot be determined, the variable-type determining unit 11 goes to Step S2-4.

Next, the variable-type determining unit 11 acquires a "variable-value list" for the variable k (Step S2-4).

The variable-type determining unit 11 tries to determine the type of the variable a from the "list of the variable values" (Step S2-5). If the type of variable a is determined, the variable-type determining unit 11 goes to Step S2-7. If the type of variable a cannot be determined, the variable-type determining unit 11 goes to Step S2-6.

The variable-type determining unit 11 is then operated manually, and determines the type of variable k (Step S2-6).

The variable-type determining unit 11 refers to the type of the variable k, and adds the variable type of the variable a (Step S2-7).

If the variable-type determining unit 11 has processed all main key variables of variable a, if any main key variable remains unprocessed, the variable-type determining unit 11 returns to Step S2-2 (Step S2-8).

If the variable-type determining unit 11 has determined the types of all variables contained in the data stored in the collected-data storing unit 21, it terminates the process. If the variable-type determining unit 11 has not determined the types of all variables, it returns to Step S2-1 (Step S2-9).

How to determine the types of the variables is not limited to the method described above, nevertheless. If Step S2-6, for example, can hardly be manually performed, only Steps S2-3 and S2-5 may be automatically performed, and the variable type may be assigned to the variable a only if the type of the variable k is automatically determined.

Figure 12:
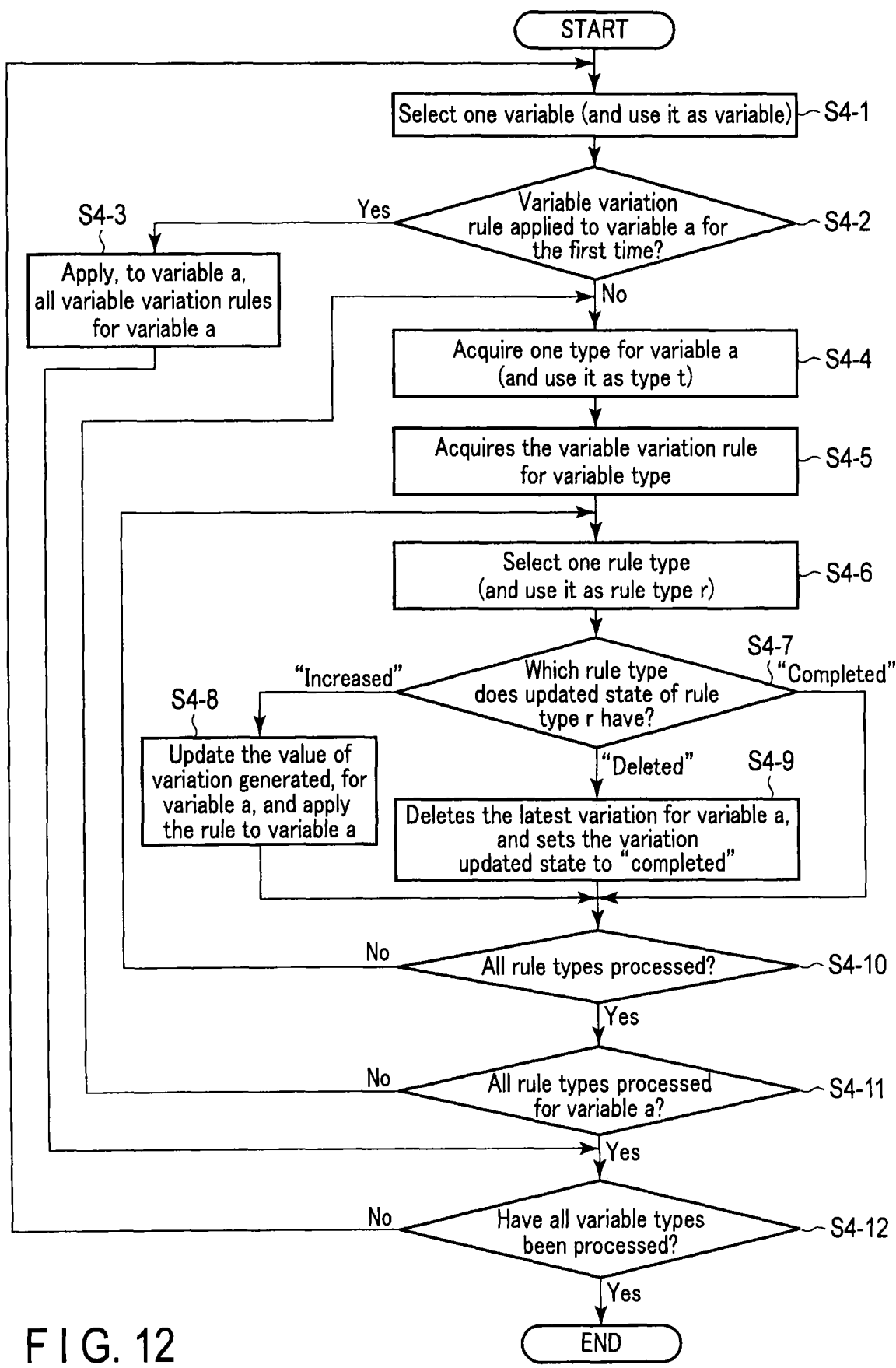
FIG. 12 is a flowchart explaining, in detail, Step S4 performed in the embodiment.

Step S4, i.e., generation of variable variations, will be explained in detail with reference to FIG. 12. The variable-variation generating unit 14 performs Step S4 by using the state data representing the state of any variable it has generated. As shown in FIG. 15 to be explained later, the state data is a table showing which variable items, variable type items, rule type items, updated state items, value items and "generated variation" items are associated with one another, each item being associated with any other item. Each variable item is a data item identified with the main key provided in the analyze data. The variable type is a data item representing "time" or "space." The rule type is a data item representing "difference from the value n days before," "difference from the value n years before," "difference from the value at point (x−n, y)" or "difference from the value at point (x, y−n)". The updated state is a data item representing the updated state of a variation, such as "increased," "completed" or "deleted." The value item is a natural number representing the value of a variation generated. The generated variation is a data item representing the value (i.e., variation) obtained by substituting the generated variation for the value n of the rule type.

Then, the variable-variation generating unit 14 applies the variable variation rule to the variables of any data processed in the preprocessing unit 12.

First, the variable-variation generating unit 14 selects a variable from the data processed in the preprocessing unit 12 (Step S4-1), and uses the variable as variable a.

The variable-variation generating unit 14 determines whether the variable variation rule is applied to the variable a for the first time (Step S4-2). If the rule is applied for the first time, the variable-variation generating unit 14 goes to Step S4-3. If the rule is applied not for the first time, the variable-variation generating unit 14 goes to Step S4-4.

The variable-variation generating unit 14 "increases" the updated state of variation for all variable types possible for variable a, thereby initializing the variation generating value n (Step S4-3) The variable-variation generating unit 14 then applies all rule types to the variable a. Thereafter, the variable-variation generating unit 14 goes to Step S4-12.

The variable-variation generating unit 14 selects one variable type for the variable a (Step S4-4). The variable type selected is type t.

The variable-variation generating unit 14 acquires the variable variation rule for the variable of type t, from the variable-variation rule storing unit 22 (Step S4-5).

The variable-variation generating unit 14 selects one rule type from the variable variation rules for the type t of variable a (Step S4-6). The variable-variation generating unit 14 uses the rule type, so selected, as rule type r.

The variable-variation generating unit 14 refers to the updated state s of the rule type r (Step S4-7). If the updated state s is "increased," the variable-variation generating unit 14 goes to Step S4-8. If the updated state is "deleted," the variable-variation generating unit 14 goes to Step S4-9. If the updated state s is "completed," the variable-variation generating unit 14 goes to Step S4-10.

Then, the variable-variation generating unit 14 updates the value of the variation generated, for the rule type r of the variable a of type t, and applies the rule type r (Step S4-8). Thereafter, the variable-variation generating unit 14 goes to Step S4-10.

The variable-variation generating unit 14 deletes the variation generated from the value of the present variation, in connection with the rule type of the variable a of type t. The variable-variation generating unit 14 then sets the variation updated state to "completed" (Step S4-9).

If the variable-variation generating unit 14 has processed all rule types for the variable type t of variable a, it goes to Step S4-11 (Step S4-10). If any rule type remains unprocessed, the variable-variation generating unit 14 returns to Step S4-6.

If the variable-variation generating unit 14 has processed all variable types of variable a, it goes to Step S4-12 (Step S4-11). If any variable type remains unprocessed, the variable-variation generating unit 14 returns to Step S4-4.

If the variable-variation generating unit 14 has processed all variables, it terminates the process (Step S4-12). If any variable type remains unprocessed, the variable-variation generating unit 14 returns to Step S4-1.

Step S6 of determining whether the analysis has been completed or not will be explained in detail, with reference to FIG. 13.

The analysis-end determining unit 16 calculates the precision of the latest analysis result (Step S6-1).

The analysis-end determining unit 16 determines whether the precision of the latest analysis result is higher than that of the previous analysis (Step S6-2). If the precision is higher than that of the previous analysis, the analysis-end determining unit 16 goes to Step S6-3. If the precision is not higher than that of the previous analysis, the analysis-end determining unit 16 goes to Step S6-4.

The analysis-end determining unit 16 determines that the data analyzing process should be continued (Step S6-3). The data analysis is then terminated.

The analysis-end determining unit 16 determines that the data analyzing process should be terminated, and terminates the data analyzing process (Step S6-4).

Figure 14:
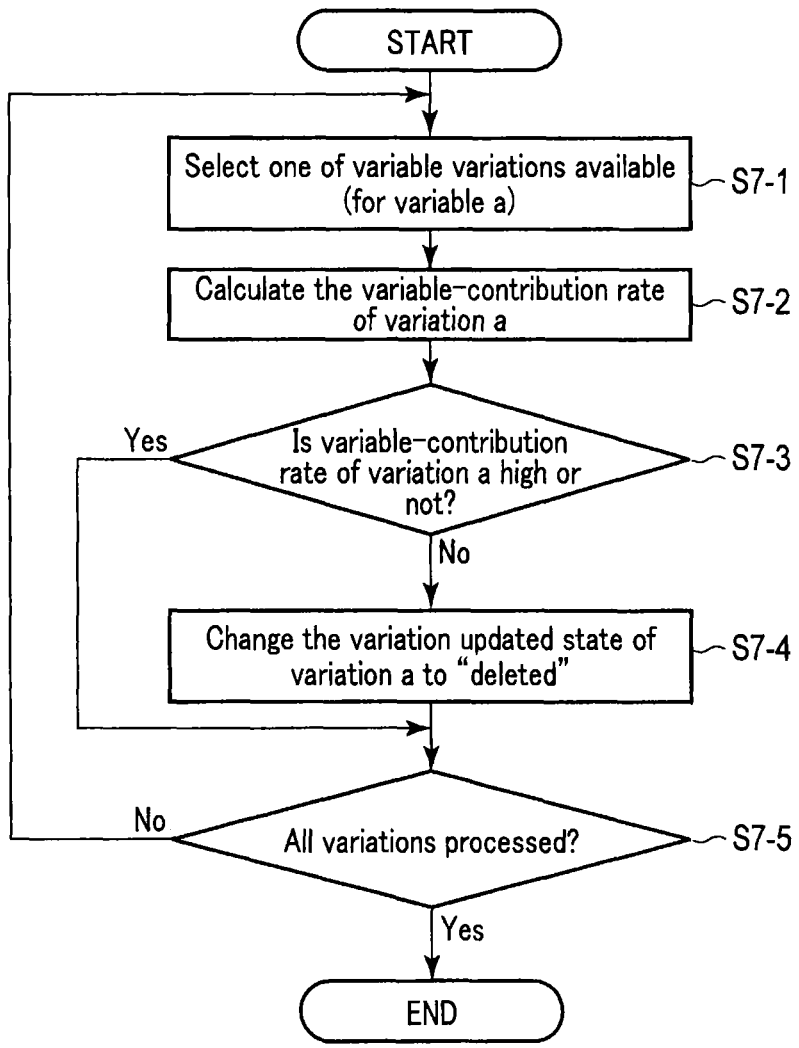
FIG. 14 is a flowchart explaining, in detail, Step S7 performed in the embodiment.

Step S7 of determining the variable-contribution rate will now be explained in detail, with reference to FIG. 14.

The variable-contribution rate determining unit 17 calculates the variable-contribution rate of each variable variation. It then determines a method of increasing the variation by repeating the analysis.

The variable-contribution rate determining unit 17 selects one of the variable variations (Step S7-1). The variable-contribution rate determining unit 17 then uses the variable variations available as variation a.

The variable-contribution rate determining unit 17 calculates the variable-contribution rate of the variation a (Step S7-2).

The variable-contribution rate determining unit 17 determines whether the variable-contribution rate of the variation a is high or not (Step S7-3). If the variable-contribution rate is low, the variable-contribution rate determining unit 17 goes to Step S7-4. If the variable-contribution rate is high, the variable-contribution rate determining unit 17 goes to Step S7-5.

Then, the variable-contribution rate determining unit 17 changes the variation updated state of the variation a to "deleted" (Step S7-4).

If all variations have been processed (Yes in Step S7-5), the variable-contribution rate determining unit 17 terminates the process. If any variation remains unprocessed (No in Step S7-5), the variable-contribution rate determining unit 17 returns to Step S7-1.

Commonly used contribution rates, such as correlation coefficients or coefficients of determination, can be used to calculate the contribution rate of each variation. Alternatively, other indices may be used instead.

To determine whether a contribution rate is high or not, a specific threshold value may be preset, or the contribution rates of other variations of the variable or those of the variations of any other variable may be used as reference values.

In the instance described above, the variation updated state of a variation is immediately changed in Steps S7-3 and S7-4, from "deleted" to "completed," if the variation has a low contribution rate. Alternatively, a threshold value may be set for the variation generated, and the variation may then be increased until it reaches the threshold value.

How a variation is generated for one specific variable will be explained below, taking the "temperature" shown in FIG. 7 as an example.

Figure 11:
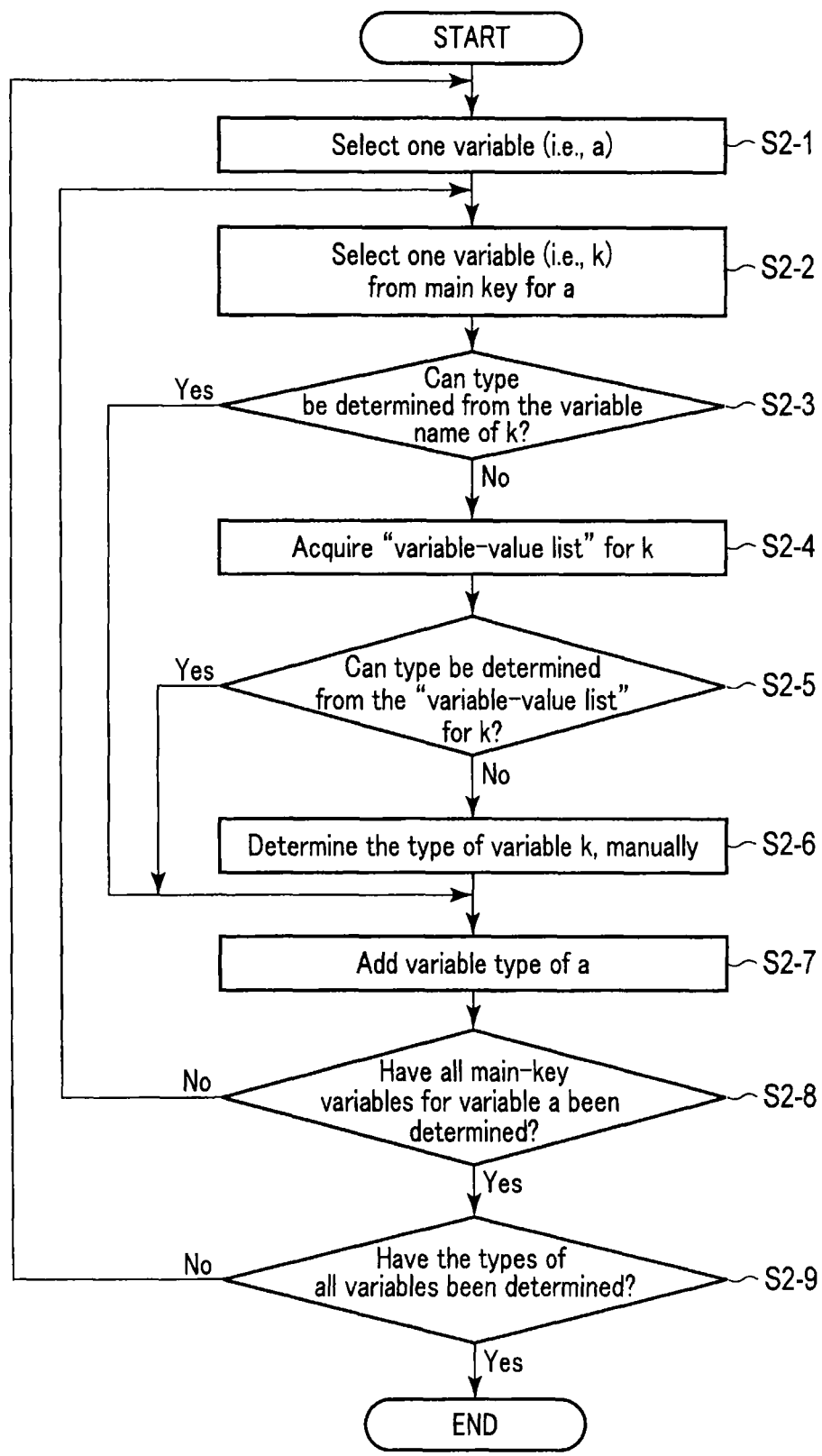
FIG. 11 is a flowchart explaining, in detail, Step S2 performed in the embodiment.

As shown in FIG. 11, the variable-type determining unit 11 selects "temperature" having a variable type not determined yet (Step S2-1).

The variable-type determining unit 11 then selects "area" from the main key (area and date) of "temperature" (Step S2-2).

Assume that the type of "area" cannot be determined from the variable name "area" (that is, No in Step S2-3). Then, the variable-type determining unit 11 therefore goes to Step S2-4.

The variable-type determining unit 11 acquires the list of variable values for the "areas", i.e., (1,1), (1,2), (1,3), . . . (Step S2-4).

Assume that the "area" is determined to have "space type," from the list of variable values for the "areas." Then, the variable-type determining unit 11 goes to Step S2-7 (Step S2-5).

The variable-type determining unit 11 adds the "space type" to the variable type of the "temperature" (Step S2-7).

The main key for the "temperature" includes a main key that has not been processed yet (that is, No in Step S2-8). Hence, the variable-type determining unit 11 returns to Step S2-2.

The variable-type determining unit 11 then selects one variable, i.e., "date," from the main key (area and date) (Step S2-2).

Assume that the type of "date" is determined to have "time type," from the variable name of "date." Then, the variable-type determining unit 11 goes to Step S2-7 (Step 2-3).

The variable-type determining unit 11 adds the "time type" to the variable type of the "temperature" (Step S2-7).

Since the variable-type determining unit 11 has processed all main key variables for the "temperature," it goes to Step S2-9.

The variable-type determining unit 11 processes all variables contained in the data stored in the collected-data storing unit 21, and terminates the process (if Yes in Step S2-9).

Note that Steps S4 to S7 of the operation sequence (FIG. 10) are repeatedly performed.

The first round of Steps S4 to S7 performed in the variable-variation generating unit 14 will be explained with reference to the flowchart of FIG. 12.

The variable-variation generating unit 14 selects "temperature" from the data processed in the preprocessing unit 12 (Step S4-1).

Since the variable-variation generating unit 14 applies the variable variation rule for the first time, it goes to Step S4-3 (Step S4-2).

The variable-variation generating unit 14 sets the variation updated state to "increased" for all variable variation rules for all variable types (i.e., time-type and space-type) of the "temperature," and sets the value of the variation generated to the initial value. Then, the variable-variation generating unit 14 applies all rule types to the "temperature" (Step S4-3). The variable-variation generating unit 14 the goes to Step S4-12. The "variation generated" for the "temperature" has such a value as shown in the rightmost column of the table shown in FIG. 15.

The variable-variation generating unit 14 processes all variables (Yes in Step S4-12), and then terminates the process.

How the analysis-end determining unit 16 operates in the first of Steps S4 to S7 will be described with reference to the flowchart of FIG. 13.

The analysis-end determining unit 16 calculates the precision of the latest analysis result (Step S6-1).

The precision of the previous analysis result is not available, and cannot be compared with the precision of the latest analysis result (Yes in Step S6-2). Therefore, the analysis-end determining unit 16 goes to Step S6-3.

Then, the analysis-end determining unit 16 determines that the data analysis should be continued (Step S6-3), and terminates the process.

The first round of Steps S4 to S7 performed in the variable-contribution rate determining unit 17 will be explained with reference to the flowchart of FIG. 14. Assume that the contribution rate is calculated by correlating the objective variable. Also assume that whether the contribution rate so calculated is high or low is determined by comparing it with a threshold value.

The variable-contribution rate determining unit 17 selects the "temperature difference from one day before," as one variable variation (Step S7-1).

The variable-contribution rate determining unit 17 calculates the variable-contribution rate of the "temperature difference from one day before" (Step S7-2).

Assume that the variable-contribution rate of the "temperature difference from one day before" is higher than the threshold value (Yes in Step S7-3). The variable-contribution rate determining unit 17 therefore goes to Step S7-5.

Since all variations have not been processed (No in Step S7-5), the variable-contribution rate determining unit 17 returns to Step S7-1.

The variable-contribution rate determining unit 17 selects the "temperature difference from one year before" (Step S7-1).

The variable-contribution rate determining unit 17 calculates the variable-contribution rate of the "temperature difference from one year before" (Step S7-2).

Assume that the variable-contribution rate of the "temperature difference from one year before" is lower than the threshold value (No in Step S7-3). The variable-contribution rate determining unit 17 goes to Step S7-4.

Then, the variable-contribution rate determining unit 17 changes the variation updated state of the "temperature difference from one year before" to state "deleted" (Step S7-4).

Since all variations have not been processed (No in Step S7-5), the variable-contribution rate determining unit 17 returns to Step S7-1.

The variable-contribution rate determining unit 17 selects the "temperature difference from the temperature at point (x−1, y), i.e., one of the variable variations (Step S7-1).

The variable-contribution rate determining unit 17 calculates the variable-contribution rate of the "temperature difference from the temperature at point (x−1, y)" (Step S7-2).

Assume that the variable-contribution rate of the "temperature difference from the temperature at point (x−1, y)" is higher than the threshold value (Yes in Step S7-3). The variable-contribution rate determining unit 17 therefore goes to Step S7-5.

Since all variations have not been processed (No in Step S7-5), the variable-contribution rate determining unit 17 returns to Step S7-1.

The variable-contribution rate determining unit 17 selects one of the variable variations (Step S7-1).

The variable-contribution rate determining unit 17 calculates the variable-contribution rate of the "temperature difference from the temperature at point (x, y−1)" (Step S7-2).

Assume that the variable-contribution rate of the "temperature difference from the temperature at point (x, y−1)" is lower than the threshold value (No in Step S7-3). The variable-contribution rate determining unit 17 therefore goes to Step S7-4.

The variable-contribution rate determining unit 17 then changes the variation updated state of the variation "temperature difference from the temperature at point (x, y−1)" to "deleted" (Step S7-4).

The variable-contribution rate determining unit 17 has thus processed all variations, and then processes also other variables (Step S7-5). Then, the variable-contribution rate determining unit 17 terminates the process. At this point, the "variation generated" about "temperature" has such a value as shown in the rightmost column of the table shown in FIG. 16.

The second round of Steps S4 to S7, in which the variable-variation generating unit 14 operates, will be explained with reference with the flowchart of FIG. 12.

The variable-variation generating unit 14 selects "temperature" from the data processed in the preprocessing unit 12 (Step S4-1).

The variable variation rule is not applied to the "temperature" for the first time (No in Step S4-2). Hence, the variable-variation generating unit 14 goes to Step S4-4.

The variable-variation generating unit 14 selects "time type," i.e., one variable type for the variable "temperature" (Step S4-4).

The variable-variation generating unit 14 acquires the variable variation rule for the variable of time type from the variable-variation rule storing unit 22 (Step S4-5).

The variable-variation generating unit 14 selects one rule type, "difference from n days before" from the variable variation rule for the "time type" of "temperature" variables (Step S4-6).

Since the variation updated state of the rule type "difference from n days before" is "increased," the variable-variation generating unit 14 goes to Step S4-8.

The variable-variation generating unit 14 updates the value of the variation generated, for the rule type "difference from n days before" of the "time type," and applies the rule (Step S4-8). Thereafter, the variable-variation generating unit 14 goes to Step S4-10. At this point, the "variation generated" for the "temperature" has such a value as shown in the rightmost column of the table shown in FIG. 17.

Since the variable-variation generating unit 14 has not processed all rule types for the variable type, i.e., "time type" for "temperature," it returns to Step S4-6 (Step S4-10).

The variable-variation generating unit 14 selects one rule type, "difference from n years before" from the variable variation rule for the "time type" of "temperature" variables (Step S4-6).

Since the updated state of the rule type, i.e. "difference from n years before," is "deleted," the variable-variation generating unit 14 goes to Step S4-9 (Step S4-7).

The variable-variation generating unit 14 deletes the variation generated from the value of the present variation in connection with the rule type of "difference from n years before." The variable-variation generating unit 14 then sets the variation updated state to "completed" (Step S4-9). At this point, the "variation generated" for the "temperature" has such a value as shown in the rightmost column of the table shown in FIG. 18.

The variable-variation generating unit 14 has processed all rule types for the variable type, i.e. "time type" for "temperature" (Yes in Step S4-10). Therefore, the variable-variation generating unit 14 goes to Step S4-11.

Since any variable type for "temperature" has not been processed (if No in Step S4-11), the variable-variation generating unit 14 returns to Step S4-4.

The variable-variation generating unit 14 selects one variable type, i.e. "space type" for the variable "temperature" (Step S4-4).

The variable-variation generating unit 14 acquires the variable variation rule for the variable of space type, from the variable-variation rule storing unit 22 (Step S4-5).

The variable-variation generating unit 14 selects one rule type, "difference from the value at point (x−n, y)," from the variable variation rule for the "space type" of "temperature" variables (Step S4-6).

Since the updated state of the variation for the "difference from the value at point (x−n, y)" is "increased" in Step S4-7, the variable-variation generating unit 14 goes to Step S4-8.

The variable-variation generating unit 14 updates the value of the variation generated, for the rule type, "difference from the value at point (x−n, y)," and applies the rule (Step S4-8). Thereafter, the variable-variation generating unit 14 goes to Step S4-10. At this point, the "variation generated" for the "temperature" has such a value as shown in FIG. 19.

Since the variable-variation generating unit 14 has not processed all rule types for the variable type, i.e., "space type," for "temperature," it returns to Step S4-6 (Step S4-10).

The variable-variation generating unit 14 selects one rule type, "difference from the value at point (x, y−n)," from the variable variation rule for the "space type" of "temperature" variables (Step S4-6).

Since the updated state of the rule type, i.e. "difference from the value at point (x, y−n)," is "deleted," the variable-variation generating unit 14 goes to Step S4-9 (Step S4-7).

The variable-variation generating unit 14 deletes the variation, i.e. "difference from the value at point (x, y−n)," generated from the value "1" of the present variation, in connection with the rule type, i.e. "difference from the value at point (x, y−n)." The variable-variation generating unit 14 then sets the variation updated state to "completed" (Step S4-9). At this point, the "variation generated" for the "temperature" has such a value as shown in the rightmost column of the table shown in FIG. 20.

The variable-variation generating unit 14 has processed all rule types for the variable type, i.e. "space type," for "temperature" (Yes in Step S4-10). Therefore, it goes to Step S4-11.

Since the variable-variation generating unit 14 has processed all variable types of "temperature," it goes to Step S4-12 (Step S4-11).

After processing all variable types of "temperature," the variable-variation generating unit 14 performs a similar process on other variables, and then terminates the process (Step S4-12).

The second round of Steps S4 to S7, in which the analysis-end determining unit 16 operates, will be explained with reference with the flowchart of FIG. 13.

The analysis-end determining unit 16 calculates the precision of the latest analysis result (Step S6-1).

Assume that the precision of the latest analysis result is higher than that of the previous analysis (that is, Yes in Step S6-2). Then, the analysis-end determining unit 16 goes to Step S6-3.

The analysis-end determining unit 16 determines that the data analyzing process should be continued (Step S6-3), and then terminates the data analysis.

The second round of Steps S4 to S7, in which the variable-contribution rate determining unit 17 operates, will be explained with reference with the flowchart of FIG. 14.

The variable-contribution rate determining unit 17 selects "temperature difference from two days before," as one variable variation (Step S7-1).

The variable-contribution rate determining unit 17 calculates the variable-contribution rate of the "temperature difference from one day before" (Step S7-2).

Assume that the variable-contribution rate of the "temperature difference from one day before" is higher than the threshold value (Yes in Step S7-3). The variable-contribution rate determining unit 17 therefore goes to Step S7-5.

The variable-contribution rate determining unit 17 returns to Step S7-1, because not all variations have been processed (No in Step S7-5).

The variable-contribution rate determining unit 17 selects "temperature difference from the value at point (x−2, y)," as one variable variation (Step S7-1).

The variable-contribution rate determining unit 17 calculates the variable-contribution rate of the "temperature difference from the value at point (x−2, y)" (Step S7-2).

Assume that the variable-contribution rate of the "temperature difference from the value at point (x−2, y)" is lower than the threshold value (No in Step S7-3). The variable-contribution rate determining unit 17 therefore goes to Step S7-4.

The variable-contribution rate determining unit 17 then changes the variation updated state of the variation "temperature difference from the value at point (x−2, y)" to "deleted" (Step S7-4).

The variable-contribution rate determining unit 17 thus processes all variations about "temperature," and processes all variations about any other variables, too (Yes in Step S7-5). Then, the variable-contribution rate determining unit 17 terminates the process.

The second round of Steps S4 to S7, in which the variable-variation generating unit 14 operates, will be explained with reference with the flowchart of FIG. 12.

The variable-variation generating unit 14 selects "temperature" (Step S4-1).

The variable variation rule is applied to "temperature," not for the first time (that is, no in Step S4-2). Therefore, the variable-variation generating unit 14 goes to Step S4-4.

The variable-variation generating unit 14 selects "time type," i.e., one variable type for "temperature" (Step S4-4).

The variable-variation generating unit 14 acquires the variable variation rule for the variable of time type from the variable-variation rule storing unit 22 (Step S4-5).

The variable-variation generating unit 14 selects one rule type, "difference from n days before" from the variable variation rule for the "time type" of "temperature" variables (Step S4-6).

Since the variation updated state of the rule type "difference from n days before" is "increased," the variable-variation generating unit 14 goes to Step S4-8 (Step S4-7).

The variable-variation generating unit 14 updates the value of the variation generated, for the rule type "difference from n days before" of the "time type" for "temperature," and applies the rule (Step S4-8). Thereafter, the variable-variation generating unit 14 goes to Step S4-10. At this point, the "variation generated" for the "temperature" has such a value as shown in the rightmost column of the table shown in FIG. 21.

Since the variable-variation generating unit 14 has not processed all rule types for the variable type, i.e., "time type" for "temperature," it returns to Step S4-6 (Step S4-10).

The variable-variation generating unit 14 selects one rule type, "difference from n years before" from the variable variation rule for the "time type" of "temperature" variables (Step S4-6).

Since the updated state of the rule type, i.e., "difference from n years before," is "completed," the variable-variation generating unit 14 goes to Step S4-10 (Step S4-7).

The variable-variation generating unit 14 has processed all rule types for the variable type, i.e. "time type" for "temperature" (Yes in Step S4-10). Therefore, the variable-variation generating unit 14 goes to Step S4-11.

Since any variable type for "temperature" has not been processed (if No in Step S4-11), the variable-variation generating unit 14 returns to Step S4-4.

The variable-variation generating unit 14 selects one variable type, i.e., "space type" for the variable "temperature" (Step S4-4).

The variable-variation generating unit 14 acquires the variable variation rule for the variable of space type, from the variable-variation rule storing unit 22 (Step S4-5).

The variable-variation generating unit 14 selects one rule type, "difference from the value at point (x−n, y)," from the variable variation rule for the "space type" of "temperature" variables (Step S4-6).

Since the updated state of the variation for the "difference from the value at point (x−n, y)" is "deleted" (Step S4-7), the variable-variation generating unit 14 goes to Step S4-8.

The variable-variation generating unit 14 deletes the "difference from the point of the variation "(x−n, y)" generated from the value "2" of the present variation, in connection with the difference from point (x−n, y) of the rule type for the time type of the variable type "temperature." Then, the variable-variation generating unit 14 sets the variation updated state to "completed" (Step S4-9). At this point, the "variation generated" about "temperature" has such a value as shown in the rightmost column of the table shown in FIG. 22.

Since the variable-variation generating unit 14 has not processed all rule types for the variable type, i.e., "space type" (No in Step S4-10), it returns to Step S4-6.

The variable-variation generating unit 14 selects one rule type, "difference from the value at point (x, y−n)," from the variable variation rule for the "space type" of "temperature" variables (Step S4-6).

Since the updated state of the variation for the "difference from the value at point (x, y−n)" is "completed" (Step S4-7), the variable-variation generating unit 14 goes to Step S4-10.

The variable-variation generating unit 14 has processed all rule types for the variable type, "space type," of "temperature." It therefore goes to Step S4-11 (Step S4-10).

The variable-variation generating unit 14 has processed all variable types of "temperature," too. It therefore goes to Step S4-12 (Step S4-11).

The variable-variation generating unit 14 has performed all processes on "temperature" (Yes in Step S4-11). The variable-variation generating unit 14 similarly processes the variations for any other variables (Yes in Step S4-11). The variable-variation generating unit 14 therefore terminates the process.

The third round of Steps S4 to S7, which the analysis-end determining unit 16 performs, will be explained with reference to the flowchart of FIG. 13.

The analysis-end determining unit 16 calculates the precision of the latest analysis result (Step S6-1).

Assume that the precision of the latest analysis result is not higher than that of the previous analysis (that is, No in Step S6-2). Then, the analysis-end determining unit 16 goes to Step S6-4.

The analysis-end determining unit 16 determines that the data analyzing process should be terminated (Step S6-4), and terminates data analyzing process.

In the processes thus far performed, three variation items for "temperature" have been generated, i.e., "temperature difference from one day before," "temperature difference from two day before" and "temperature difference from the temperature at point (x−n, y)." As described above, the space-type variable is any variable that changes in accordance with the position it assumes in space. For example, it is the "temperature at an adjacent point at the same time" with respect to a "temperature at a point at specific time."

In order to generate these three variation items, the variable-variation generating unit 14 needs only to refer to the values of the "date" and "area" that are the main key of meteorological data, thereby calculating the value of "temperature." FIG. 23 shows a method of calculating the "temperature difference from one day before," and FIG. 24 shows a method of calculating the "temperature difference from the value at the point (x−n, y)."

That is, the variable-variation generating unit 14 subtracts the temperature value associated with the date that is one day before a specific date, from the temperature value associated with the specific date, with respect to the areas having the same value in the analysis data. Thus, the variable-variation generating unit 14 calculates the variation values (i.e., −2.6, 1.1, −1.5, . . . ) that are "temperature differences from one day before."

Similarly, the variable-variation generating unit 14 subtracts the temperature value associated with the date that is two days before a specific date, from the temperature value associated with the specific date, with respect to the areas having the same value in the analysis data. Thus, the variable-variation generating unit 14 calculates the variation values (i.e., −1.5, −0.4, . . . ) that are "temperature differences from two days before."

Further, the variable-variation generating unit 14 subtracts the temperature value associated with the area that is adjacent to an area having a specific area code, from the temperature value associated with the temperature value of the area having the specific area code, with respect to the dates having the same value in the analysis data. Thus, the variable-variation generating unit 14 calculates the variation values (i.e., 0.0, −0.8, 2.1, . . . ) that are "temperature differences from the value at "point (x−n, y)."

The variable-variation generating unit 14 then writes the variation value calculated and the analysis data in the analysis-data set storing unit 23.

In the embodiment described above, the type of each variable is determined, and variations of each variable are generated on the basis of the variable type determined and the variable variation rule defining the method of generating variations of the variable. The variable-contribution rate at which the variation generated contributes to the objective variable is then calculated. From the variable-contribution rate calculated, it is determined whether the variable should be used or deleted. Thus, variables can be generated by utilizing the conversion formula (i.e., variable variation rule) that differs, depending on the variables to generate.

More precisely, the variables are classified in accordance with types, and different conversion formulas are applied to the respective types of variables, thereby generating new variables. A synthesis tool appropriate for variables of each type can therefore be automatically determined.

In the embodiment, the variable variation rule stored in the variable-variation rule storing unit 22 is changed in response to any rule-changing instruction input. An appropriate variable variation rule can therefore be set as needed.

In the embodiment, any variation generated is analyzed. If the precision of the latest analysis result is higher than that of the previous analysis, the variable-contribution rate mentioned above is calculated. The previous analysis result is then referred to. The variable contributing to the precision increase of the latest analysis result is used, generating a new variable. Thus, the result of the data analysis performed can be utilized well.

Regarding this, in the system of Patent Literature 2, a time series (e.g., three-dimensional moving average and three-dimensional autoregression) of monitored values is generated in accordance with the conditions prescribed for the set of attribute values (e.g., manufacture number and lot number) associated with the monitored values. In the system of Patent Literature 2, the time-series data thus generated is compared with the original time-series data, automatically determining the variation of the value monitored (e.g., decrease of the center value), and the user is informed of the value variation determined.

In the In the system of Patent Literature 2, however, the attribute value set and the generation logic, both used to generate the time series, are fixed and used every time the data is analyzed, and never fed back with the result of the previous data analysis. Inevitably, the result of the previous data analysis cannot be utilized at all.

In the embodiment of this invention, the result of the previous data analysis is utilized, generating variables, as has been described above.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data analysis supporting apparatus designed to generate a plurality of variable variations from analysis data having an objective variable, an explanatory variable for the objective variable, and a key variable of the explanatory variable, a numerical data item of the explanatory variable being uniquely identified by a numerical data item of the key variable, thereby supporting an analysis of the analysis data, the apparatus comprising:
 processing circuitry configured to:
  refer to the key variable, and determine a parameter corresponding to the referred to key variable as a variable type of the explanatory variable, the numerical data item of the key variable changing with the parameter;
  generate the plurality of variable variations corresponding to the explanatory variable in accordance with the determined variable type and with a variable variation rule that defines a method of generating the plurality of variable variations based on the variable type; and
  calculate a rate at which the generated variable variation contributes to the objective variable for each of the plurality of variable variations, and determine, based on the rate, whether the generated variable variation is applied or not for the analysis.

2. The data analysis supporting apparatus according to claim 1, the processing circuitry further configured to:
 store the variable variation rule; and
 change the variable variation rule stored in the variable-variation rule storing device, in response to a rule-changing instruction.

* * * * *